(12) United States Patent
Nagasawa et al.

(10) Patent No.: US 7,571,462 B2
(45) Date of Patent: Aug. 4, 2009

(54) INFORMATION PROCESSING APPARATUS, TRANSFER PROGRAM PRODUCT, AND TRANSFER CONTROL METHOD

(75) Inventors: Tatsumi Nagasawa, Tokyo (JP); Takashi Yomo, Kanagawa-wan (JP)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 11/219,504

(22) Filed: Sep. 3, 2005

(65) Prior Publication Data
US 2006/0080449 A1 Apr. 13, 2006

(30) Foreign Application Priority Data
Sep. 7, 2004 (JP) ............................. 2004-260198

(51) Int. Cl.
*H04L 9/32* (2006.01)
(52) U.S. Cl. .................... 726/2; 726/3; 726/4; 726/5; 726/6
(58) Field of Classification Search ............... 726/1–8, 726/16–21; 713/165–168, 150, 155, 170, 713/191
See application file for complete search history.

(56) References Cited

U.S. PATENT DOCUMENTS 6,622,151 B1 * 9/2003 Hamamoto et al. ......... 707/202
2003/0070094 A1 * 4/2003 Gomes et al. ............... 713/201

FOREIGN PATENT DOCUMENTS

JP 2003-044560 2/2003

\* cited by examiner

*Primary Examiner*—Hosuk Song
(74) *Attorney, Agent, or Firm*—Randall J. Bluestone (57) ABSTRACT

Setting information is transferred to an information processing apparatus from another information processing apparatus. The information processing apparatus includes a transfer unit, a rule unit, an acquiring unit, and an updating unit. The transfer unit sets transfer instruction information to instruct a transfer process to be performed, when the user logs in and while an administrator is logged in. The rule unit sets up an operating environment for the user based on rule setting information in a case when the user logs into the information processing apparatus for the first time. The acquisition unit acquires setting information of the user from a transfer file where the setting information acquired from the other information processing apparatus as a transfer source is stored while the user is logged in, where the transfer instruction information has been set. The updating unit updates the rule setting information with the acquired setting information.

17 Claims, 8 Drawing Sheets

INFORMATION PROCESSING APPARATUS, TRANSFER PROGRAM PRODUCT, AND TRANSFER CONTROL METHOD

RELATED APPLICATIONS

The present patent application claims priority under 35 USC 119 to the previously filed Japanese (JP) patent application entitled "Information processing apparatus, transfer program product, and transfer controlling method," filed on Sep. 7, 2004, and assigned Ser. No. 2004-260198.

FIELD OF THE INVENTION

The present invention relates generally to an information processing apparatus, a transfer program product, and a transfer control method. More particularly, the present invention relates to transferring the operating environment of a user from one information processing apparatus to another, and a corresponding such transfer program product and transfer control method.

BACKGROUND OF THE INVENTION

LANs (local area networks) connecting many personal computers to each other are commonly used in enterprises and other environments. While personal computers have become more sophisticated, they are still technologically advancing rapidly. As a result, personal computers still have to be replaced with newer machines relatively often. An administrator who is responsible for replacing computers with newer machines usually has to ensure that the process will occur smoothly. When a large number of machines are replaced, the operational burden on the administrator can be enormous.

One technology that has been used to transfer setting information of an operating environment for a user between an old information processing apparatus and a new information processing apparatus is described in Japanese Published Unexamined Patent Application No. 2003-44560. Software has been accordingly developed to transfer the setting information of the operating environment for a user between information processing apparatuses, such as that described in "Introduction and User's Guide of System Migration Assistant," available on the Internet at www-6.ibm.com/jp/pc/migration/sma/. According to these technologies, setting information to be transferred can be selected by the user. As a result, the amount of data that is transferred can be reduced, and unnecessary setting information does not have to be transferred.

Within a LAN connecting information processing apparatuses running versions of the Windows® operating system, a domain controller is typically used in which administers can enter passwords for users in a centralized manner. A domain controller is thus a particular type of information processing apparatus. In a LAN using such a domain controller, setting information particular to a user is distributed to, and stored in, the domain controller as well as in the client information processing apparatus of the user. For example, setting information for a user group to which a user belongs is stored in the domain controller, whereas user-specific setting information for an application program is stored in the client information processing apparatus of the user.

In client information processing apparatuses connected to such a LAN, replacing client information processing apparatuses with new ones without causing inconvenience to users also desirably requires transferring the setting information from the old apparatuses to the new apparatuses in a way that is not overly burdensome on the administrator in charge. According to the prior art technologies described in the previous paragraphs, when such transfer is accomplished, a user may need to log into his or her new information processing apparatus for the setting information transferred from the old apparatus to the new apparatus. The transfer process can thus be burdensome for the administrator, since he or she has to collect passwords from all the users. Collecting passwords is also undesirable due to the security risks involved in aggregating such sensitive information in one place.

Transferring setting information can also be accomplished without collecting passwords of all the users, if the password of the administrator of the entire domain is known. The password of the administrator of the entire domain enables the transfer process to be performed for all information processing apparatuses on the LAN. The administrator password is quite powerful, however, and allows a large number of other types of processes to be performed for all information processing apparatuses on the LAN. Therefore, the administrator password is preferably kept secret, known only to the administrator, and usage of this password is best minimized or avoided. For instance, if just one client information processing apparatus is being replaced, then the password of the user for this apparatus should be used, instead of the password of the administrator of the entire domain. In other words, there are also security risks involved in using the administrator password to transfer setting information when replacing information processing apparatuses.

For these and other reasons, therefore, there is a need for the present invention.

SUMMARY OF THE INVENTION

The present invention relates to an information processing apparatus, a transfer program product, and a transfer control method that can solve the problems described above. An information processing apparatus of one embodiment of the invention is a transfer destination, to which setting information for setting up an operating environment is transferred from another information processing apparatus that is a source destination. The information processing apparatus includes a transfer instruction information setting unit for setting a transfer instruction information to instruct a transfer process corresponding to a first user to be performed when the first user logs in and while a second user having administrator authority is logged in. The information processing apparatus further includes a rule setting information setting unit for setting up an operating environment for the first user based on predetermined rule setting information when the first user logs in to the information processing apparatus for the first time.

In one embodiment, the information processing apparatus may also include a login user setting information acquiring unit and/or a setting information updating unit. The login user setting information acquiring unit is for acquiring the setting information of the first user from a transfer file where the setting information acquired from the other information processing apparatus as a transfer source is stored while the first user is logged in, where the transfer instruction information has been set for the first user. The setting information updating unit is for updating the rule setting information with at least a part of the setting information that has been acquired, and for transferring at least a part of the operating environment of the first user at the other information processing apparatus as the transfer source.

A system of an embodiment of the invention includes a first information processing apparatus of a first user, and a second information processing apparatus to replace the first information processing apparatus of the first user. The system includes a transfer instruction information setting unit for setting a transfer instruction information to instruct a transfer process corresponding to the first user to be performed when the user logs into the second information processing apparatus and while a second user having administrator authority is logged into the second information processing apparatus. The system also includes a rule setting information setting unit for setting up an operating environment for the first user on the second information processing apparatus based on predetermined rule setting information when the first user logs into the second information processing apparatus for the first time.

A transfer control method of an embodiment of the invention is for controlling an information processing apparatus as a transfer destination to which setting information for setting up an operating environment is transferred from another information processing apparatus. The method sets transfer instruction information to instruct a transfer process corresponding to a first user to be performed when the first user logs in and while a second user having administrator authority is logged in. The method acquires, while the first user is logged in, the setting information of the first user from a transfer file where the setting information acquired from the information processing apparatus as a transfer source is stored, in a case where the transfer instruction information corresponding to the first user has been set. The method also updates the rule setting information with at least a part of the setting information that has been acquired, and for transferring at least a part of the operating environment of the first user at the other information processing apparatus as the transfer source.

An article of manufacture of an embodiment of the invention includes a computer-readable medium and means in the medium. The computer-readable medium may be a recordable data storage medium, a modulated carrier signal, or another type of computer-readable medium. The means is for setting transfer instruction information to instruct a transfer process corresponding to a first user to be performed when the first user logs in and while a second user having administrator authority is logged in. The means is further for acquiring while the first user is logged in the setting information of the first user from a transfer file, where the transfer instruction information for the first user has been set Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
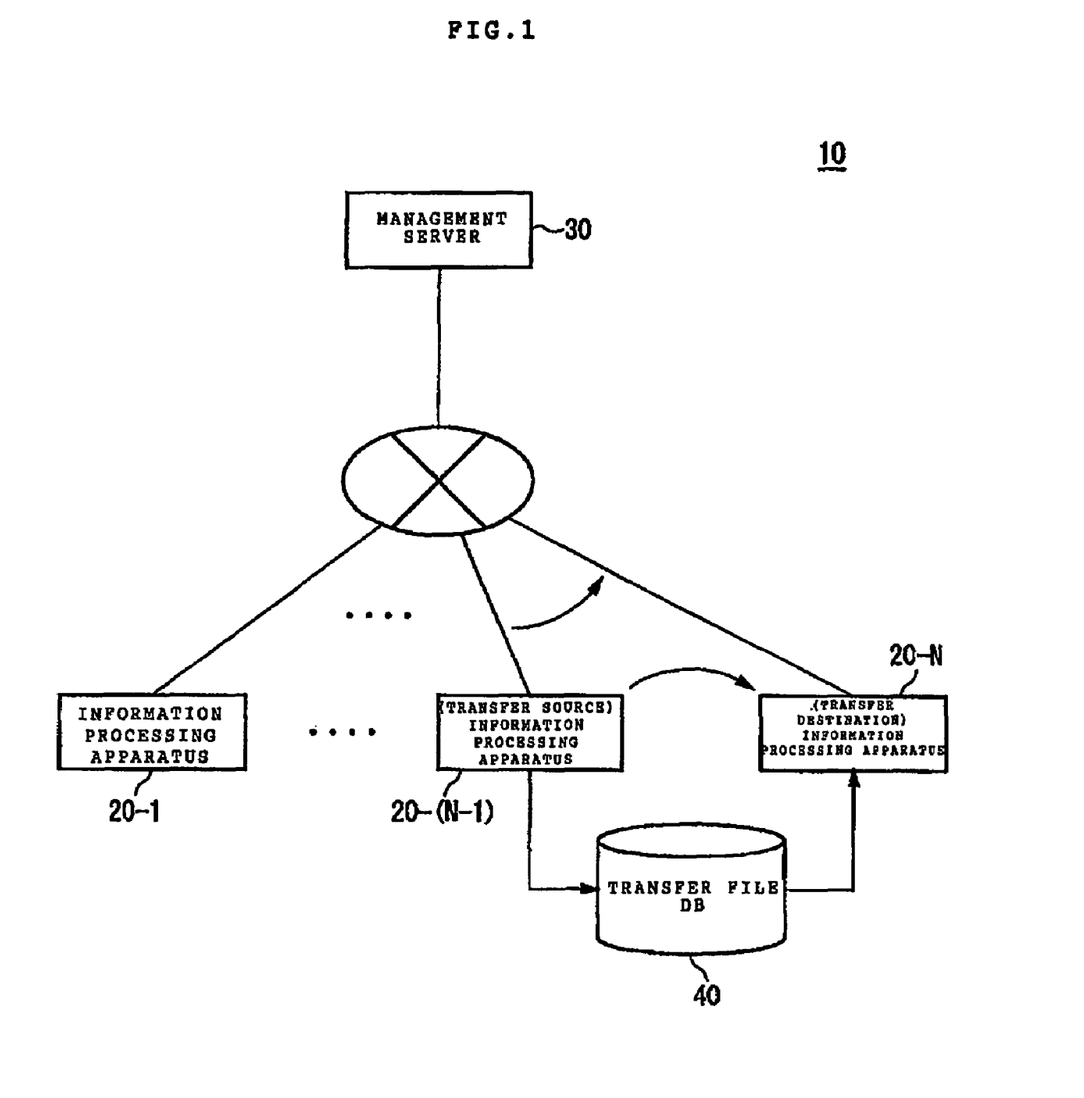
FIG. 1 shows a configuration of an information processing system, according to an embodiment of the invention.

FIG. 1 shows a configuration of an information processing system 10, according to an embodiment of the invention. The information processing system 10 includes information processing apparatuses 20-1 to 20-N, a management server 30, and a transfer file database (DB) 40. The information processing apparatus 20-N is an information processing apparatus that is a transfer destination to which setting information for setting up an operating environment for each user is transferred from the information processing apparatus 20-(N−1), which is an information processing apparatus that is a transfer source. In addition, the information processing apparatus 20-N transfers the setting information of each user from the information processing apparatus 20-(N−1) to the information processing apparatus 20-N by an administering user of the information processing apparatus 20-N without requiring each user to do complicated work.

The management server 30 can be; for example, a domain controller in a Windows® operating system, and authenticates users of the information processing apparatuses 20-1 to 20-N participating in the same domain as that of the information processing apparatus 20-N. Specifically, for example, when a user logs in to the information processing apparatus 20-N, a password and the like of the user concerned are transmitted to the management server 30. Then, the management server 30 authenticates the user by the received password, and returns a result of the authentication to the information processing apparatus 20-N. Only when the password is authenticated correctly does the information processing apparatus 20-N permit the login of the user.

The transfer file DB 40 stores a transfer file where setting information acquired from the information processing apparatus 20-(N−1) is stored. Specifically, for example, when the information processing apparatus 20-N is newly installed as the replacement for the information processing apparatus 20-(N−1), the setting information and the like that are set in the information processing apparatus 20-(N−1) are first recorded in the transfer file DB 40 by the information processing apparatus 20-(N−1). Then, the information processing apparatus 20-N acquires the setting information and the like from the transfer file recorded in the transfer file DB 40, and sets the acquired setting information and the like in the information processing apparatus 20-N.

Figure 2:
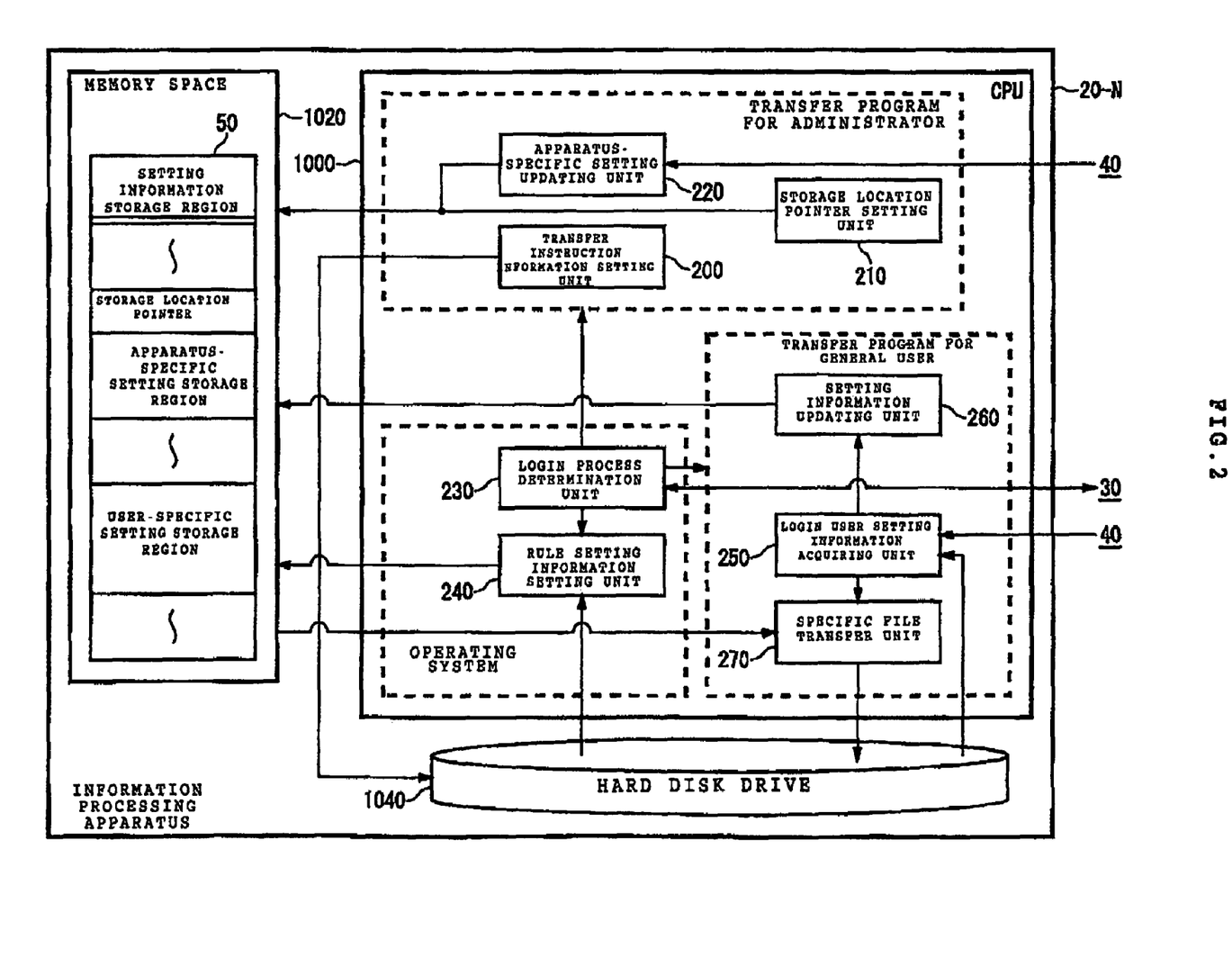
FIG. 2 shows a configuration of another information processing apparatus, according to an embodiment of the invention.

FIG. 2 shows a configuration of the information processing apparatus 20-N, according to an embodiment of the invention. The information processing apparatus 20-N includes a central processing unit (CPU) 1000, a random access memory (RAM) 1020, and a hard disk drive 1040. The details of a hardware configuration of the information processing apparatus 20-N are described later in relation to FIG. 8. Therefore, FIG. 2 just shows the minimum configuration needed for explaining functioning of the information processing apparatus 20-N.

The CPU 1000 functions as a transfer instruction information setting unit 200, a storage location pointer setting unit 210, and an apparatus-specific setting updating unit 220, in accordance with a portion of a transfer program for transferring the setting information, where this portion is operating while the user having administrator authority is logged in. Moreover, the CPU 1000 functions as a login process determination unit 230 and a rule setting information setting unit 240 by the operating system. Furthermore, the CPU 1000 functions as a login user setting information acquiring unit 250, a setting information updating unit 260 and a specific file transfer unit 270, in accordance with a portion of the transfer program, where this portion is operating while a general user is logged in (i.e., not a user having administrator authority).

The transfer instruction information setting unit 200 sets transfer instruction information to instruct a transfer process corresponding to each user to be performed when the user logs in. For example, from the setting information recorded in the transfer file DB 40, the transfer instruction information setting unit 200 selects a portion to be transferred to the information processing apparatus 20-N when the user logs in, on the basis of an instruction from the user having the administrator authority, and the like. Then, the transfer instruction information setting unit 200 stores, in the hard disk drive 1040, a file which records an instruction to transfer the selected setting information, and thus sets the transfer instruction information.

The storage location pointer setting unit 210 sets a storage location pointer that indicates a predetermined storage region in the hard disk drive 1040 as a storage location of a file specific to each user. Specifically, the storage location pointer setting unit 210 records the storage location of the file specific to each user in a setting information storage region 50 on a memory space of the RAM 1020. The apparatus-specific setting updating unit 220 updates setting information for setting up an operating environment specific to the information processing apparatus 20-N with setting information for setting up an operating environment specific to the information processing apparatus 20-(N−1), which is acquired from the transfer file DB 40.

Upon receiving a login request from a user, the login process determination unit 230 transmits a password entered by the user to the management server 30. Then, the login process determination unit 230 receives an authentication result of the transmitted password from the management server 30. Thus, the login process determination unit 230 determines whether or not to permit the login of the user. The rule setting information setting unit 240 sets up an operating environment for each user on the basis of predetermined rule setting information in the case where the user logs in to the information processing apparatus 20-N for the first time.

The login user setting information acquiring unit 250 acquires setting information of each user from a transfer file recorded in the transfer file DB 40 in the case where the transfer instruction information corresponding to the user is set while the user is logged in. For example, in the case where a file which records an instruction to transfer setting information is stored in the hard disk drive 1040, the login user setting information acquiring unit 250 may determine that the transfer instruction information is set. Moreover, the login user setting information acquiring unit 250 acquires the file specific to each user from the transfer file concerned.

The setting information updating unit 260 updates the rule setting information with at least a part of the acquired setting information. As a result, at least a part of the operating environment for each user, which is set in the information processing apparatus 20-(N−1), is transferred to the information processing apparatus 20-N. Meanwhile, the specific file transfer unit 270 stores the file specific to each user, which is acquired from the information processing apparatus 20-(N−1), in the storage location indicated by the set storage location pointer in the case where the user logs in to the information processing apparatus 20-N for the first time.

Figure 3:
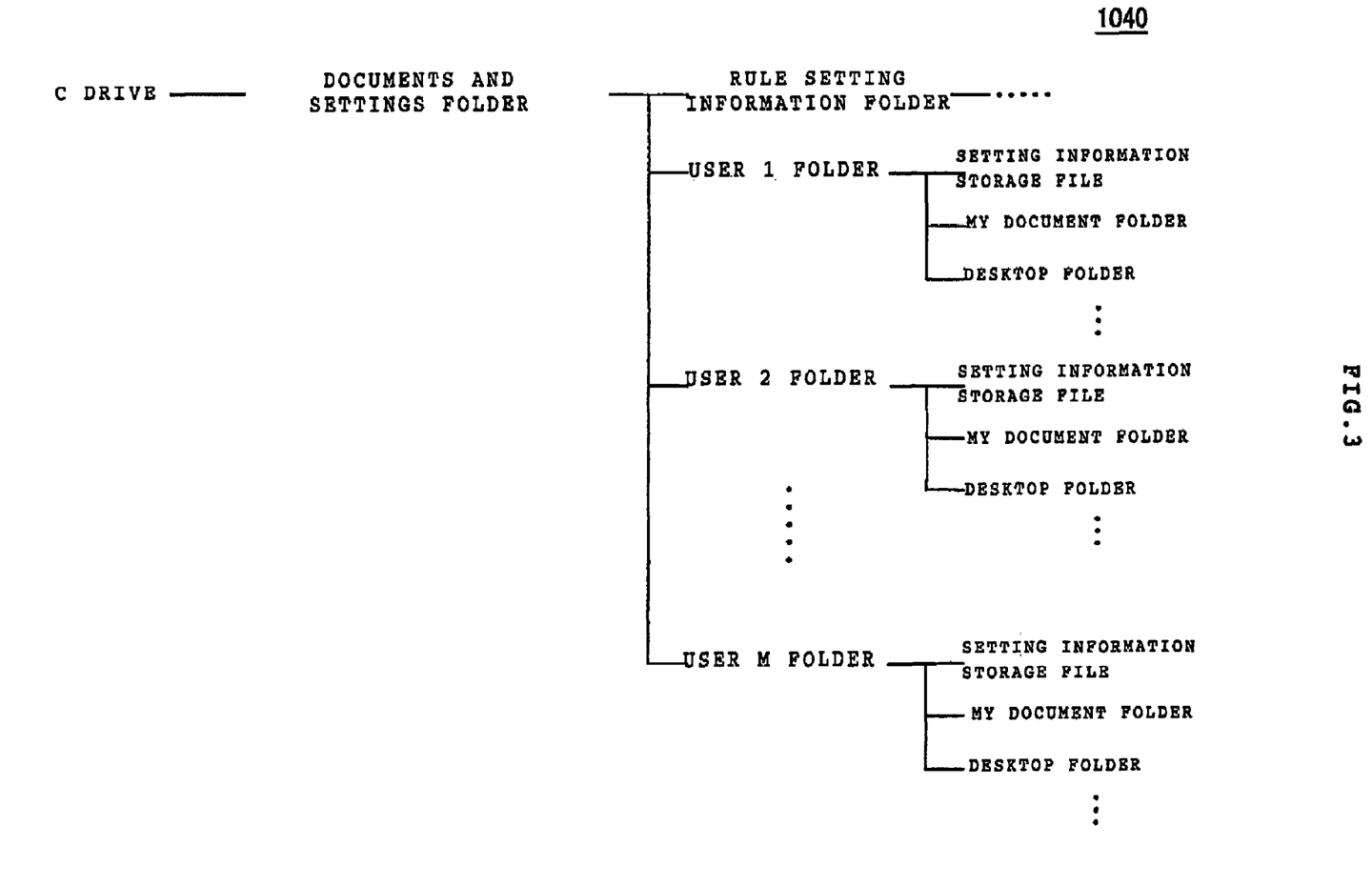
FIG. 3 shows an example of a data structure of a hard disk drive, according to an embodiment of the invention.

FIG. 3 shows an example of a data structure of the hard disk drive 1040, according to an embodiment of the invention. The hard disk drive 1040 manages files and folders that store the files according to a hierarchical structure. Specifically, the hard disk drive 1040 includes a documents and settings folder in a logical drive with a volume label C. Moreover, in the documents and settings folder, the hard disk drive 1040 includes plural folders in each of which the file specific to each user is stored.

Specifically, for example, the hard disk drive 1040 includes a user 1 folder, a user 2 folder, . . . , and a user M folder underneath the documents and settings folder in the hierarchy. Moreover, in a rule setting information folder, which is located underneath the documents and settings folder in the hierarchy, the hard disk drive 1040 stores the rule setting information for defining, in advance, the operating environment to be set for the user who logs in for the first time.

In the user 1 folder, the hard disk drive 1040 includes a setting information storage file, a My Document folder, and a desktop folder. The setting information storage file is a file that records setting information for setting up an operating environment of a user 1. Specifically, when the user 1 logs into the information processing apparatus 20-N, the operating system reads the setting information for setting up the operating environment of the user 1 out of the setting information storage file, and stores the read setting information in the user-specific setting information storage region in the memory space. In the case where a user logs in to the information processing apparatus 20-N for the first time, the rule setting information setting unit 240 reads the rule setting information out of the rule setting information folder, and stores the read rule setting information in the user-specific setting information storage region in the memory space for this user.

Moreover, when the user 1 logs in to the information processing apparatus 20-N, files and folders in the desktop folder are displayed as icons on an initial screen, which can be referred to as a desktop screen, displayed after the login. Subsequently, in the case where the icon of My Document of the user 1 is selected, files and folders in the My Document folder are displayed as icons. Processing performed in the case where each of a user 2 to a user N logs in to the information processing apparatus 20-N is substantially the same as the processing in the case where the user 1 logs in. Accordingly, description thereof is omitted.

Figure 4:
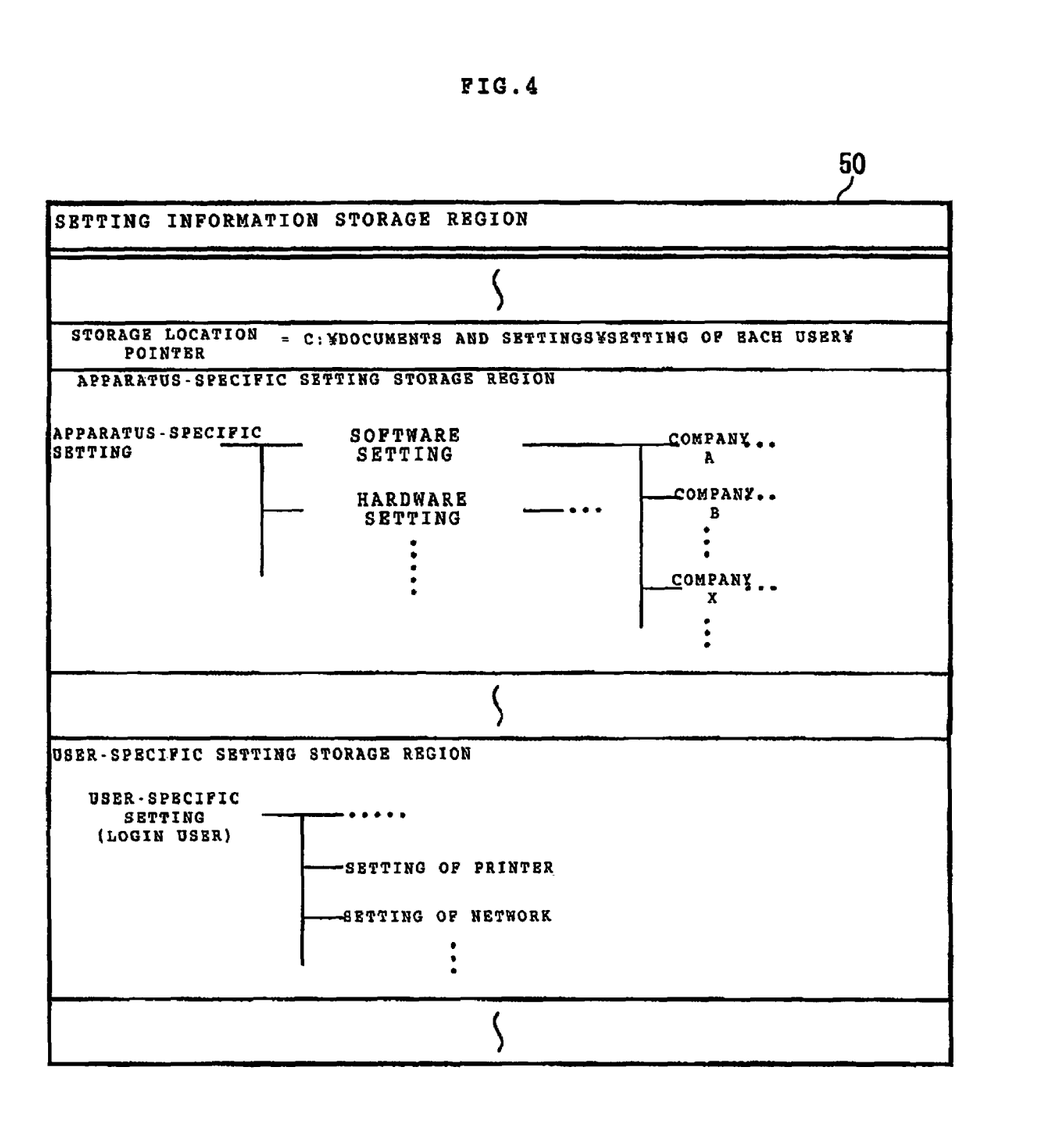
FIG. 4 shows an example of a configuration of a setting information storage region, according to an embodiment of the invention.

FIG. 4 shows an example of a configuration of the setting information storage region 50, according to an embodiment of the invention. The setting information storage region 50 includes the storage location pointer that indicates the region in the hard disk drive 1040, which serves as the storage location of the file specific to each user. The setting information storage region 50 further includes an apparatus-specific setting storage region that holds the setting information specific to the information processing apparatus 20-N, and the user-specific setting storage region that holds the setting information specific to a login user who has logged in to the information processing apparatus 20-N.

The setting information in one embodiment, as depicted in FIG. 4, is the registry within the Windows® operating system. In this case, the storage location pointer is an item of the registry, which is referred to as a profile path, and indicates a path to a folder that stores a file specific to each user. In this embodiment, the storage location pointer setting unit 210 sets a path to the folder in the hard disk drive 1040 as the storage location pointer. Thus, the file specific to the user can be prevented from being stored in the management server 30 and the other information processing apparatuses, and the file specific to the user can be transferred adequately by the specific file transfer unit 270.

The RAM 1020 hierarchically manages various types of setting information in each of the apparatus-specific setting storage region and the user-specific setting storage region. Specifically, underneath the apparatus-specific setting as the top level in the hierarchy, software setting, hardware setting and the like are managed. Moreover, underneath the software setting in the hierarchy, setting of software of each company is managed for each distributor of the software. Furthermore, underneath the user-specific setting as the top level in the hierarchy of the user-specific setting information, various types of settings of a user who is currently logged in. For example, settings of a printer and network of the user are managed.

As an example, in the Windows® operating system, the registry is represented as a set of the respective setting items, referred to as keys, which define the operating environment of the information processing apparatus 20-N. For example, the apparatus-specific setting is managed as a key called HKey-LocalMachine, and the user-specific setting is managed as a key called HKeyCurrentUser. Moreover, the software setting in the apparatus-specific setting is managed as a key called HKeyLocalMachine\SOFTWARE.

By a function provided in the operating system, when the user logs in, the CPU 1000 reads the setting information of the user from the hard disk drive 1040, and expands the setting information in the user-specific setting storage region in the RAM 1020. When the user logs out, or when the expanded setting information is changed, the CPU 1000 writes back the setting information in the RAM 1020 to the setting information storage file in the hard disk drive 1040. In this way, the setting of the login user is expanded in the memory, thus making it possible to be accessed at high speed. Moreover, settings of non-login users are removed from the memory, thus making it possible to reduce the occupied region within the memory.

In the operating system as described above, in order to transfer the setting information from other information processing apparatuses to the information processing apparatus 20-N, it is also possible that each setting information storage file in the hard disk drive 1040 may be copied in advance from the transfer source by an operation of the user having administrator authority, and the like. However, in the case where the user logs in to the information processing apparatus 20-N for the first time, the setting information of the user concerned is not recorded in the hard disk drive 1040. Therefore, where the user logs in for the first time, the predetermined rule setting information is read and expanded in the user-specific setting storage region by the rule setting information setting unit 240.

Specifically, for a user who has not logged in before, the operating system operates on the premise that the setting information storage file does not exist. If the setting information storage file is copied from the transfer source before the user logs in on the premise described above, then, in some situations, the operating system may create a new setting information storage file without using the copied setting information storage file. In such situations, the setting information to be transferred may not be transferred properly. Therefore, the information processing apparatus 20-N in this embodiment updates the setting information once expanded in the RAM 1020 and, accordingly, can transfer the operating environment properly without violating the premise of the operating system. Furthermore, when the user logs out, the updated operating environment is written back to the setting information recording file, and accordingly, the operating environment that has been already updated can be obtained only by the normal operation of the operating system at the next login.

Figure 5:
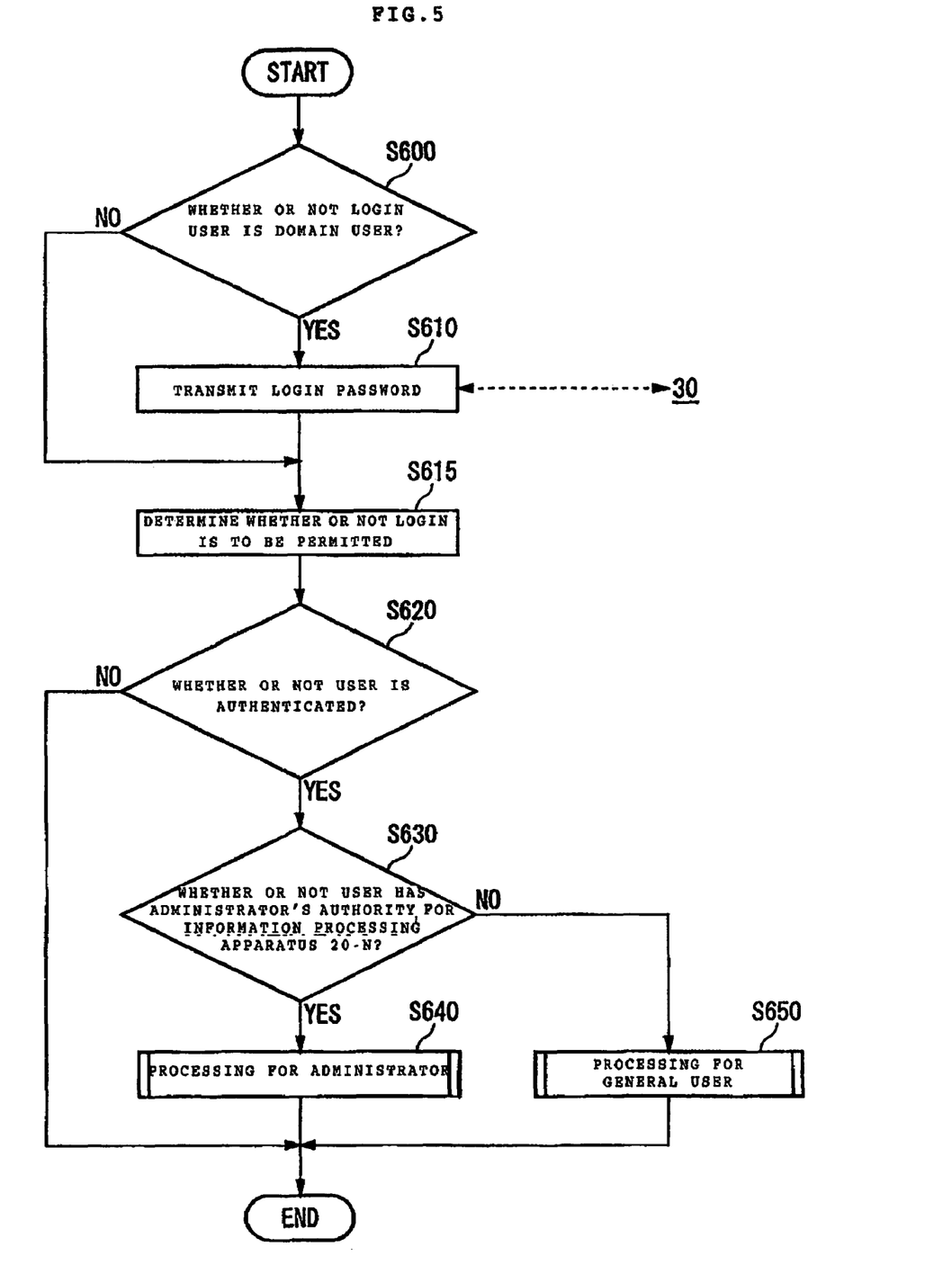
FIG. 5 is a flowchart of a method performed by an information processing system, according to an embodiment of the invention.

FIG. 5 is a flowchart of a method showing processing by the information processing system 10, according to an embodiment of the invention. The information processing system 10 performs the following processing upon receiving the login request from any of the users, for example, upon receiving a login identifier (ID) and a login password. First, the login process determination unit 230 determines whether or not the user who logs in is a user of the domain, who is hereinafter referred to as a domain user, as managed by the information processing apparatus 20 (S600). In the case where the user is the domain user (S600: YES), the login process determination unit 230 transmits the login password of the domain user to the information processing apparatus 20, and receives an authentication result of the login password (S610).

The login process determination unit 230 determines whether or not to permit the login of the user on the basis of the received password, the authentication result received from the management server 30, or the like (S615). In the case where the user is authenticated correctly (S620: YES), the login process determination unit 230 subsequently determines whether or not the login user has the administrator's authority for the information processing apparatus 20-N (S630). In the case where the user has administrator authority (S630: YES), the information processing apparatus 20-N performs processing for the administrator in accordance with a portion of the transfer program, which operates under a condition that the user having administrator authority has logged in (S640). In the case where the user does not have the administrator authority (S630: NO), the information processing apparatus 20-N performs processing for a general user in accordance with a portion of the transfer program that operates under a condition that the general user who does not have administrator authority has logged in (S650).

Figure 6:
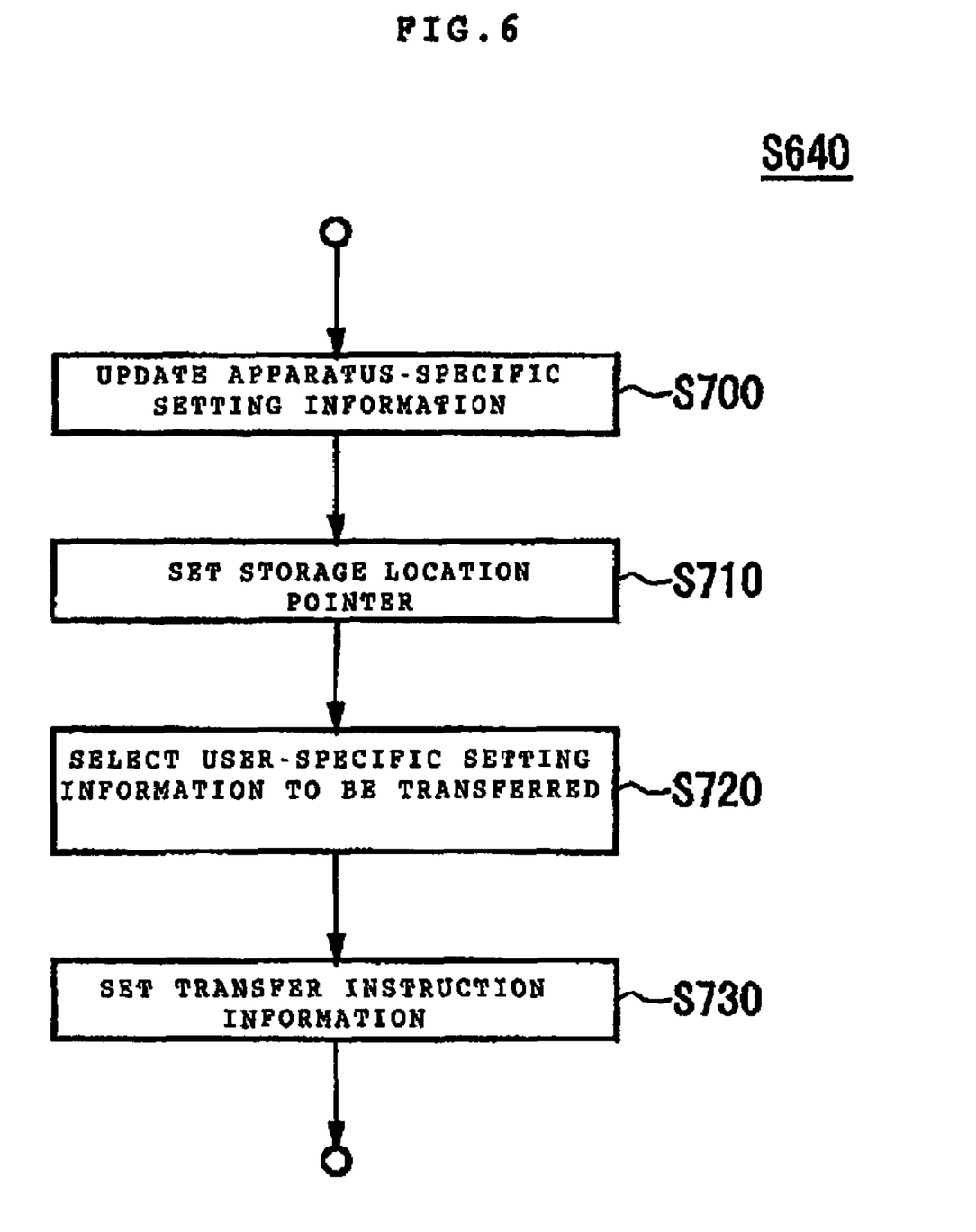
FIG. 6 shows details of a portion of the method of FIG. 5, according to an embodiment of the invention.

FIG. 6 shows details of the process in S640 of FIG. 5, according to an embodiment of the invention. The apparatus-specific setting updating unit 220 updates the setting information for setting up the operating environment specific to the information processing apparatus 20-N with the setting information for setting up the operating environment specific to the information processing apparatus 20-(N−1) (S700). Next, the storage location pointer setting unit 210 sets the storage location pointer which indicates the storage location of the file specific to each user (S710). Next, from the setting information acquired from the information processing apparatus 20-(N−1), the transfer instruction information setting unit 200 selects the portion to be transferred to the information processing apparatus 20-N when the user logs in, on the basis of the instruction from the user having administrator authority, and the like (S720). Then, the transfer instruction information setting unit 200 sets an instruction to transfer the selected portion in the setting information as the transfer instruction information (S730).

Figure 7:
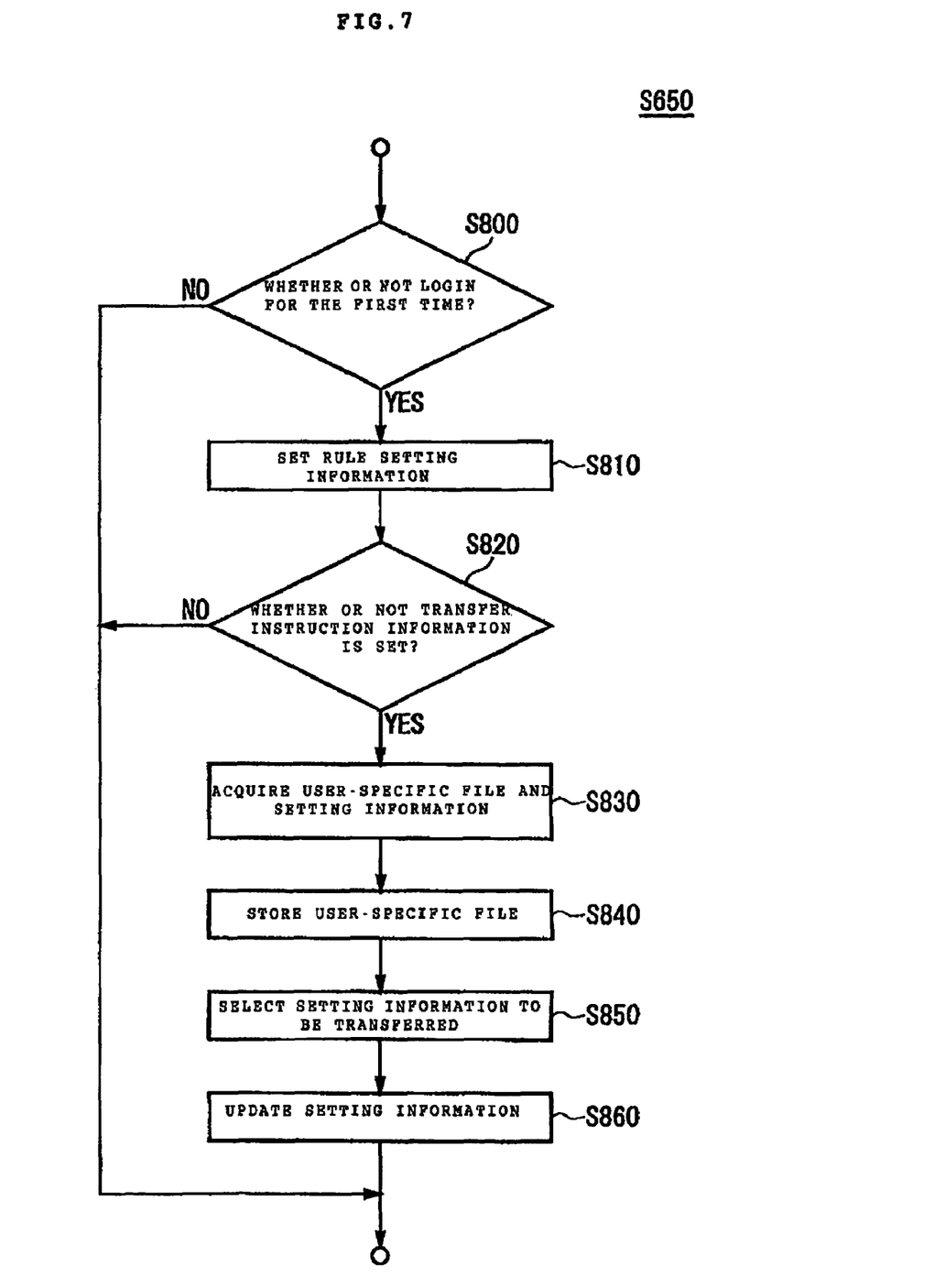
FIG. 7 shows details of another portion of the method of FIG. 5, according to an embodiment of the invention.

FIG. 7 shows details of the process in S650 of FIG. 5, according to an embodiment of the invention. The rule setting information setting unit 240 determines whether or not the user for which the process of FIG. 5 is being performed has logged into the information processing apparatus 20-N for the first time (S800). In the case where the user has logged in for the first time (S800:YES), the rule setting information setting unit 240 sets up the operating environment of the user on the basis of the rule setting information (S810). Then, in the case where the transfer instruction information corresponding to this user is set (S820:YES), the login user setting information acquiring unit 250 acquires the setting information of the user and the user-specific file for the user from the transfer file recorded in the transfer file DB 40 (S830).

Next, the specific file transfer unit 270 stores the user-specific file in the storage location indicated by the storage location pointer set corresponding to the user for which the process is being performed (S840). Next, the setting information updating unit 260 selects a portion of the acquired setting information, which is indicated by the transfer instruction information (S850). Furthermore, from the selected setting information, the setting information updating unit 260 selects setting information for an application program installed in the information processing apparatus 20-N. Then, the setting information updating unit 260 updates the rule setting information set in S810 with the selected setting information (S860).

In place of the above, or in addition to the above, the setting information updating unit 260 may select, from the setting information acquired from the transfer file DB 40, the setting information to be transferred, on the basis of the instruction from the user who has logged in. As described above, the setting information to be transferred may be determined for each user by the user having administrator authority, or may be determined when the user in question logs, in accordance with the instruction from the user and a state of the information processing apparatus 20-N. Thus, not only the operating environment of the information processing apparatus that is the transfer source can be transferred in its entirety, but also the operating environment selected according to the intention of both of the administrator and the general user can be set in the information processing apparatus that is the transfer destination.

As described above, according to this embodiment, the transfer process can be completed only by the operation of the user having administrator authority without requiring each user to log into the information processing apparatus that is the transfer destination and to which the setting information is to be transferred, when such transfer work is performed. As a result, even if the password of each user is managed by another server and it is difficult to acquire the password by the administrator of the information processing apparatuses on the client side, the setting information can nevertheless be transferred properly and easily.

Figure 8:
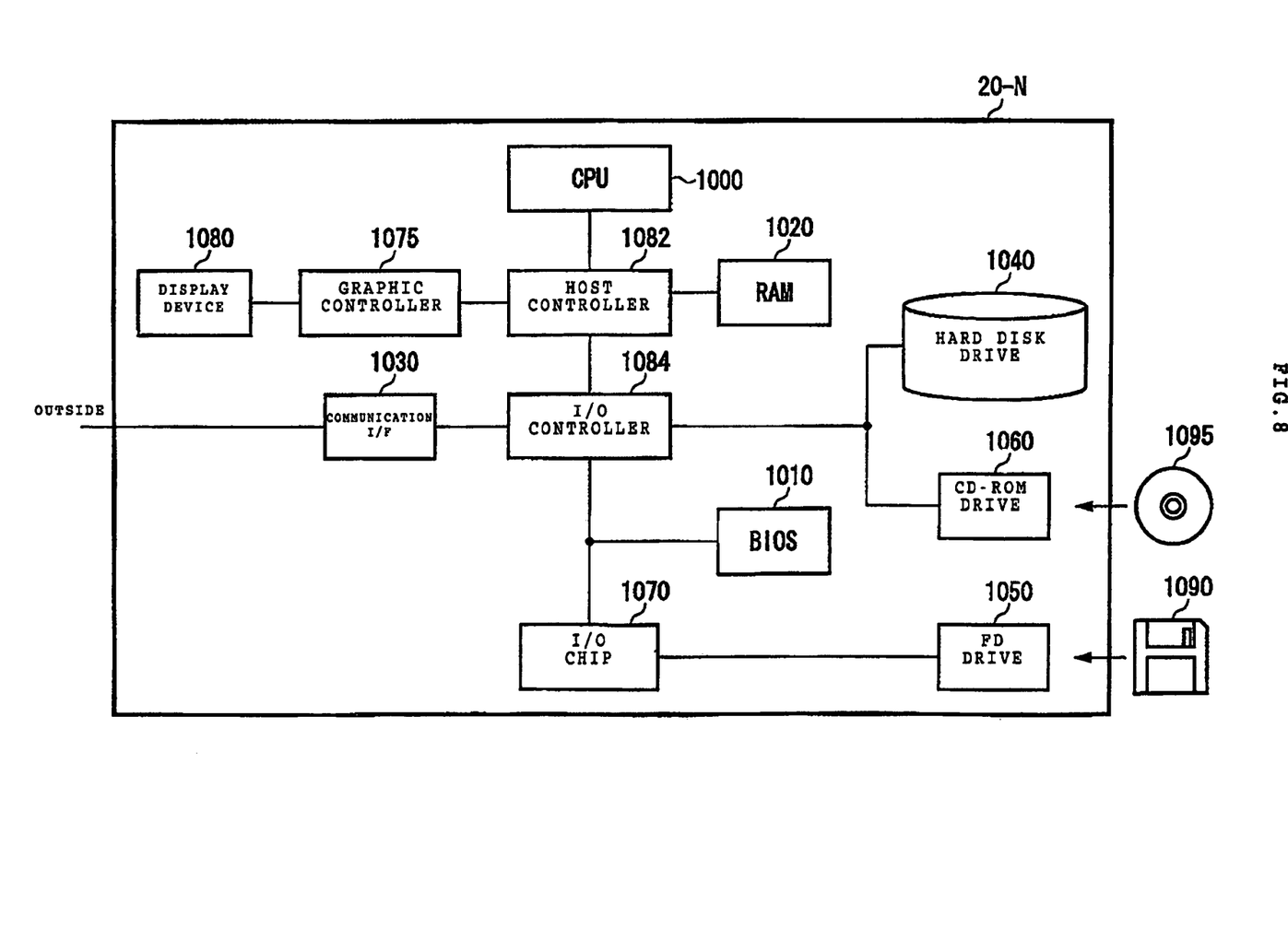
FIG. 8 shows an example of a hardware configuration of an information processing apparatus, according to an embodiment of the invention.

FIG. 8 shows an example of the hardware configuration of the information processing apparatus 20-N, according to an embodiment of the invention. The information processing apparatus 20-N includes a CPU and its peripheral unit, which includes the CPU 1000, the RAM 1020, and a graphic controller 1075, which are interconnected by a host controller 1082. The information processing apparatus 20-N further includes an input/output unit having a communication interface 1030, the hard disk drive 1040, and a CD-ROM drive 1060, which are connected to the host controller 1082 by an input/output controller 1084. The information processing apparatus 20-N finally includes a legacy input/output unit that includes a basic input/output system (BIOS) 1010, a floppy disk drive 1050, and an input/output chip 1070, which are connected to the input/output controller 1084.

The host controller 1082 interconnects the RAM 1020, and the CPU 1000 and the graphic controller 1075 which access the RAM 1020 at a high transfer rate. The CPU 1000 operates on the basis of programs stored in the BIOS 1010 and the RAM 1020, and controls the respective units. The graphic controller 1075 acquires image data formed on a frame buffer which the CPU 1000 and the like provide in the RAM 1020, and displays an image on a display device 1080. Alternatively, the graphic controller 1075 may include the frame buffer which stores the image data formed by the CPU 1000 and the like in the inside thereof.

The input/output controller 1084 interconnects the host controller 1082, and the communication interface 1030, the hard disk drive 1040 and the CD-ROM drive 1060, which are relatively high-speed input/output devices. The communication interface 1030 communicates with an external device through a network. The hard disk drive 1040 stores the programs and data that the information processing apparatus 20-N uses. The CD-ROM drive 1060 reads the programs or data from a CD-ROM 1095, and provides the read programs or data to the input/output chip 1070 through the RAM 1020.

Furthermore, the BIOS 1010 and relatively low-speed input/output devices such as the floppy disk drive 1050 and the input/output chip 1070 are connected to the input/output controller 1084. The BIOS 1010 stores a boot program executed by the CPU 1000 at the time of activation of the information processing apparatus 20-N, programs depending on the hardware of the information processing apparatus 20-N, and the like. The floppy disk drive 1050 reads a program or data from a floppy disk 1090, and provides the read program or data to the input/output chip 1070 through the RAM 1020. The input/output chip 1070 connects to the information processing apparatus 20-N, the floppy disk 1090 and various input/output devices through, for example, a parallel port, a serial port, a keyboard port, a mouse port and the like.

Each of the programs provided to the information processing apparatus 20-N is stored in a recording medium such as the floppy disk 1090, the CD-ROM 1095 and an integrated circuit (IC) card, and is provided by the user. The programs are read out from the recording medium through the input/output chip 1070 and/or the input/output controller 1084, installed in the information processing apparatus 20-N, and executed therein. Operations that the programs cause the information processing apparatus 20-N to perform are the same as the operations in the information processing apparatus 20-N that are described with reference to FIGS. 1 to 7, and accordingly, description thereof is omitted.

The programs described above may be stored in an external recording medium. An optical recording medium such as a DVD and a PD, a magneto-optical recording medium such as an MD, a tape medium, a semiconductor memory such as an IC card, and the like, can be used as such a recording medium besides the floppy disk 1090 and the CD-ROM 1095. Moreover, a storage device such as a hard disk and a RAM that are provided in a server system connected to a private communication network and the Internet may be used as the recording medium, and the program may be provided to the information processing apparatus 20-N through the network.

The present invention has been described above in relation to a particular embodiment or embodiments. However, the scope of the present invention is not limited to the scope described in relation to the above-described embodiments. It can thus be appreciated by those skilled in the art that various alterations or modifications can be made to the above-described embodiments. It is further readily apparent to those of ordinary skill within the art that the scope of claims encompasses aspects added and/or alterations or modifications made to the present invention as embodiments of which have been specifically described above. For instance, even when a user does not log into an information processing apparatus that is a transfer destination during the transfer process, the present invention enables the setting information of the user to be transferred properly. Therefore, although embodiments of the present invention have been described in detail, it should be understood that various changes, substitutions, and alternations can be made therein without departing from spirit and scope of the invention as defined by the following claims.

What is claimed is:

1. An information processing apparatus as a transfer destination, to which setting information for setting up an operating environment is transferred from another information processing apparatus, comprising:
   a transfer instruction information setting unit for setting a transfer instruction information to instruct a transfer process corresponding to a first user to be performed when the first user logs in and while a second user having administrator authority is logged in;
   a rule setting information setting unit for setting up an operating environment for the first user based on predetermined rule setting information when the first user logs in to the information processing apparatus for the first time;
   a login user setting information acquiring unit for acquiring the setting information of the first user from a transfer file where the setting information acquired from the other information processing apparatus as a transfer source is stored while the first user is logged in, where the transfer instruction information has been set for the first user; and,
   a setting information updating unit for the rule setting information with at least a part of the setting information has been acquired, and for transferring at least a part of the transfer source.

2. The information processing apparatus of claim 1, further comprising an apparatus-specific setting updating unit for updating setting information for setting up an operating environment specific to the information processing apparatus with information for setting up an operating environment specific to the other information processing apparatus as the transfer source while the second user having administrator authority is logged in.

3. The information processing apparatus of claim 1, wherein the information processing apparatus is connected to a management server for authenticating users of all information processing apparatuses participating in the same domain as a domain of the information processing apparatus.

4. The information processing apparatus of claim 3, further comprising a login process determination unit for determining whether to permit login of a third user by transmitting a password entered by the third user to the management server in response to a login request from the third user.

5. The information processing apparatus of claim 1, wherein the setting information updating unit selects setting information for an application program installed in the information processing apparatus from the acquired setting information, and updates the rule setting information with the selected setting information.

6. The information processing apparatus of claim 1, wherein, from the setting information acquired from the other information processing apparatus as the transfer source, the transfer instruction information setting unit selects a portion to be transferred to the information processing apparatus as the transfer destination when the first user logs in, and sets an instruction to transfer the selected portion as the transfer instruction information.

7. The information processing apparatus of claim 6, wherein the setting information updating unit updates the rule setting information by the portion instructed to be transferred by the transfer instruction information in the acquired setting information.

8. The information processing apparatus of claim 1, further comprising a storage location pointer setting unit for setting a storage location pointer that indicates a predetermined storage region in the information processing apparatus as a storage location of a file specific to the first user while the second user having the administrator authority is logged in.

9. The information processing apparatus of claim 8, further comprising a specific file transfer unit for storing the file specific to the first user, which is acquired from the other information processing apparatus as the transfer source, in the storage location indicated by the set storage location pointer when the first user logs in the information processing apparatus for the first time.

10. A system comprising:
    a first information processing apparatus of a first user;
    a second information processing apparatus to replace the first information processing apparatus of the first user;
    a transfer instruction information setting unit for setting a transfer instruction information to instruct a transfer process corresponding to the first user to be performed when the user logs into the second information processing apparatus and while a second user having administrator authority is logged into the second information processing apparatus;
    a rule setting information setting unit for setting up an operating environment for the first user on the second information processing apparatus based on predetermined rule setting information when the first user logs into the second information processing apparatus for the first time;
    a login user setting information acquiring unit for acquiring the setting information of the first user from a transfer file where the setting acquired from the first information processing apparatus is stored while the first user is logged in, where the transfer instruction information has been set for the first user; and,
    a setting information updating the rule setting information with at least a part of the setting information that has been acquired, and for transferring at least a part of the operating environment of the first user at the information processing apparatus.

11. The system of claim 10, further comprising an apparatus-specific setting updating unit for updating setting information for setting up an operating environment specific to the second information processing apparatus with information for setting up an operating environment specific to the first information processing apparatus while the second user having administrator authority is logged in.

12. The system of claim 10, wherein the second information processing apparatus is connected to a management server for authenticating users of all information processing apparatuses participating in the same domain as a domain of the second information processing apparatus.

13. The system of claim 10, wherein the setting information updating unit selects setting information for an application program installed in the second information processing apparatus from the acquired setting information, and updates the rule setting information with the selected setting information.

14. The system of claim 10, wherein, from the setting information acquired from the first information processing apparatus, the transfer instruction information setting unit selects a portion to be transferred to the second information processing apparatus when the first user logs in, and sets an instruction to transfer the selected portion as the transfer instruction information.

15. The system of claim 10, further comprising a storage location pointer setting unit for setting a storage location pointer that indicates a predetermined storage region in the second information processing apparatus as a storage location of a file specific to the first user while the second user having the administrator authority is logged into the second information processing apparatus.

16. A transfer control method for controlling an information processing apparatus as a transfer destination to which setting information for setting up an operating environment is transferred from another information processing apparatus, the method comprising:

setting transfer instruction information to instruct a transfer process corresponding to a first user to be performed when the first user logs in and while a second user having administrator authority is logged in;

acquiring, while the first user is logged in, the setting information of the first user from a transfer file where the setting information acquired from the information processing apparatus as a transfer source is stored, in a case where the transfer instruction information corresponding to the first user has been set; and, updating the rule setting information with at least a part of the setting information that has been acquired, and for transferring at least a part of the operating environment of the first user at the other information processing apparatus as the transfer source.

17. An article of manufacture comprising:

a computer-readable medium; and, means in the medium for setting transfer instruction information to instruct a transfer process corresponding to a first user to be performed when the first user logs in and while a second user having administrator authority is logged in, and for acquiring while the first user is logged in the setting information of the first user from a transfer file, where the transfer instruction information for the first user has been set, wherein the mean is further for updating the rule setting information with at least a part of the setting information has been acquired, and for transferring at least a part of the operating environment of the user.

* * * * *